US006899267B2

(12) United States Patent
Knepple et al.

(10) Patent No.: US 6,899,267 B2
(45) Date of Patent: May 31, 2005

(54) METHOD FOR LABELLING SAMPLE CONTAINERS

(75) Inventors: Ronny Knepple, Uberlingen (DE); Hubert Riegger, Salem (DE)

(73) Assignee: Berthold GmbH & Co. KG (DE)

( * ) Notice: Subject to any disclaimer, the term of this patent is extended or adjusted under 35 U.S.C. 154(b) by 0 days.

(21) Appl. No.: 09/403,072

(22) PCT Filed: Feb. 12, 1999

(86) PCT No.: PCT/EP99/00943

§ 371 (c)(1), (2), (4) Date: Jan. 19, 2000

(87) PCT Pub. No.: WO99/41014

PCT Pub. Date: Aug. 19, 1999

(65) Prior Publication Data

US 2003/0136839 A1 Jul. 24, 2003

(30) Foreign Application Priority Data

Feb. 13, 1998 (DE) ........................................ 198 06 049

(51) Int. Cl.[7] .................................................. G06F 7/00
(52) U.S. Cl. .......................................... 235/376; 65/162
(58) Field of Search ........................ 235/462.01, 462.03, 235/454, 494, 462.08, 376, 383, 462.02, 349; 65/17.1, 158, 162

(56) References Cited

U.S. PATENT DOCUMENTS 3,745,314 A * 7/1973 Mathias et al.
4,004,904 A * 1/1977 Fergusson .................... 65/158
4,230,266 A * 10/1980 Juvinall
4,270,863 A * 6/1981 Trogdon
4,476,381 A * 10/1984 Rubin
4,691,830 A * 9/1987 Ahl et al.
4,705,551 A 11/1987 Robinson, Jr. ............... 65/60.1
5,347,726 A * 9/1994 Quadracci et al. ............ 34/465
5,458,714 A * 10/1995 Brandt et al.
5,507,388 A 4/1996 Kildal et al. ............. 206/459.5
5,510,610 A * 4/1996 Baldwin ................. 250/223 B
5,670,118 A 9/1997 Sponholtz ................... 422/102
5,939,468 A * 8/1999 Siddiqui ..................... 523/161

FOREIGN PATENT DOCUMENTS

DE 32 42 489 A1 * 5/1984
DE 3732245 A1 * 4/1988 ............. A61J/9/02
EP 0 088 914 9/1983
EP 0 398 717 11/1990
JP 05-000821 A * 1/1993
WO WO 9855956 A2 * 12/1998 ........... B29C/49/00

* cited by examiner

*Primary Examiner*—Diane I. Lee
(74) *Attorney, Agent, or Firm*—St. Onge Steward Johnston & Reens LLC

(57) ABSTRACT

A method of providing sample containers with an automatically readable identification for an analysis device, in which the sample container may be heated to an operating temperature. It is the object of the invention to improve the identification of sample containers in a manner that the sample contained in the sample container is not contaminated by the constituents of the identification agent during analysis. The object of the invention is solved in that during the manufacturing process of the sample container, the identification is applied during the final cooling phase of the ready sample container in a temperature interval between a maximum temperature during the sample container manufacture and the operating temperature. By the method according to the invention, volatile constituents of the identification agent re advantageous evaporated during the manufacturing process, so that when using the sample container during operating temperature of the analysis device, the sample to be analyzed is no longer contaminated by the exhaling constituents of the identification agent.

9 Claims, 2 Drawing Sheets

METHOD FOR LABELLING SAMPLE CONTAINERS

FIELD OF THE INVENTION

The present invention refers to a method of identifying sample containers for an analysis device, in which the sample containers can be heated to a temperature, having an automatically readable identification.

BACKGROUND OF THE INVENTION

The identification of sample containers serves for clearly identifying the sample to be analyzed so that the analysis results can be clearly allocated to the sample and incorrect allocations are avoided, in particular when a plurality of similar sample containers are used. A plurality of methods of identifying samples are known, which are used in accordance with the application purpose of the sample container.

In the simplest case, the sample container is marked by hand, for instance by a felt pen (e.g. a waterproof pen). If analysis devices having a read unit for automatically reading sample identifications are used, the hand-written identification can generally not be automatically read by the read unit. A measuring protocol provided with an identification therefore usually requires the manual input of the identification into an input unit of the analysis device. This requires more work with the risk of incorrect allocation when the identification is incorrectly input.

A further possible allocation of the sample container may for instance be performed indirectly through a position number of the sample container in a magazine. This disadvantage is that a clear identification of the sample container is not detected automatically and therefore a manual allocation of the sample container and the position number is required. Incorrect allocations between the sample (sample container) and the position number may occur, in particular when a plurality of magazine charges are to be analyzed.

In analysis devices having a read unit for reading sample container identifications, as e.g. a bar code, a clear allocation of the sample container identification and the analysis results is performed as schematically shown in FIG. 1.

The sample container 1 is provided by the user with a machine-readable code 2, which is for instance printed onto an identification label. The identification may for instance be generated by means of a computer 3 by a printer (encoding means) 4 and may be adhered onto the sample container 1. The sample container 1 is identified (decoded) in the analysis device 5, wherein the identification along with the measuring results is handed back to the computer. As an alternative to the adhesive label, the identification can also be printed directly onto the sample container, wherein, however, each user requires a special identification unit (encoding means 4) instead of a conventional printer, which allows the marking of sample containers. An identification unit of that kind usually causes clearly higher costs of purchase and can be used for a specific purpose only. When using adhesive labels, disadvantages may result with respect to the constructional tolerances of the sample containers, since the adhesive label changes the dimensions of the sample container which is provided with a label. In the head space gas-chromatography, the sample container is heated up to a temperature of approximately 300° C., wherein the thermostatization of the sample container is performed in a small opening with very narrow tolerances within a heating block. Thus, an identification by adhesive labels cannot be performed. Furthermore, the adhesives of the adhesive labels have a temperature stability insufficient for this application. The attachment of the identification by hand is also often not practicable, since in case of precision measurements the sample containers should not be touched after a cleaning process in order to avoid impurification and therefore a falsification of the analysis results.

A further decisive disadvantage of the methods described so far is that constituents of the identification ink or constituents of the adhesive of the adhesive label or of the label contaminate the substance analyzed during measurement, in particular when the sample containers and samples are severely heated as in head space gas-chromatography (e.g. to 300° C.).

SUMMARY OF THE INVENTION

It is the object of the present invention to eliminate the above-mentioned disadvantages and to provide an improved method of identifying sample containers.

This object is solved by the invention in that during the manufacturing process of the sample container, the identification is applied during the final cooling phase of the ready sample container in a temperature interval between a maximum temperature during sample container manufacture and the operating temperature of the sample container in the analysis device.

The method according to the invention leads to significant advantages for the user, since the application of the identification (e.g. an encoding) on the sample container becomes superfluous, which saves for instance the use of identification units. Thus, the costs of the analysis process are generally lowered, since the number of working steps for the analysis and possible sources of error during sample identification are reduced.

Since the identification during a temperature interval between a maximum temperature occurring during the sample manufacture and the operating temperature of the sample container is performed in the analysis device, the advantage results that the marking agents (e.g. ink) during identification of the sample container are heated to a temperature higher than the operating temperature, wherein the volatile constituents of the marking agent evaporate already during the manufacturing process and the identification does not contaminate the sample by de-gassing constituents during the analysis process due to this heating. This is in particular significant in the application of sample containers in the head space gas-chromatography, since the identification together with the sample container is exposed to high temperatures, wherein the sensitivity of this analysis method is very high so that even the slightest impurification of the sample by the identification agent would be harmful. In addition, the sample containers do not need to be touched after a possible cleaning procedure in order to apply an identification, thus further reducing the risk of an impurification of the sample container and therefore a contamination of the samples.

The increased temperature of the sample container when applying the identification advantageously results in an "abrasion-resistant" identification, since the marking agent burns into the surface of the sample container, which may for instance consist of glass, and therefore better adheres to the surface of the sample container. Thus, the marking agent may more favorably bond with the surface of the sample container, wherein the connection may be performed both chemically and physically (e.g. by means of adsorption, fusion or diffusion).

Since the identification is applied during the final cooling phase of the sample container manufacture, the additional advantage results that the sample container must not be heated for applying the identification in order to include the above-described advantages of such an identification. This significantly reduces the costs of the identification method due to the reduced number of method steps and due to the saving of energy.

Since the identification is already performed at the manufacturer side, the possibility advantageously results to attach the identification in the form of continual series numbers (encoded and/or not encoded) so that the sample containers can be clearly identified worldwide. Additionally, there is the advantageous possibility of including information into the identification, such as the manufacturing date of the sample container, the materials used, the purpose, size etc.

The identification is preferably applied at temperatures between 300° C. and 600° C., which is why the sample containers identified in this manner are especially suitable for the head space gas-chromatography in which the sample containers are heated to up to 300° C. This ensures, as described above, that the marking agents do not contaminate the sample in the sample container during the analysis, e.g. by de-gassing.

The identification of the sample container is preferably applied by means of an ink jet printing method of the known ink jet printing technology, in which the single-colored or multi-colored identification is printed onto a surface of the sample container by means of appropriate inks.

Furthermore, special inks can also be used which reveal the identification only by UV illumination, wherein the fluorescent wavelength area of the ink may for instance be adapted to the spectral sensitivity of the read device. The application of the identification by means of the ink jet printing method has the advantage, besides the above-mentioned advantages, that the dimensional accuracy is not influenced by the identification. Thus, sample containers identified in this manner also fulfill the geometric tolerance demands for the use in head space gas chromatographs. An additional advantage of the ink jet print technology results from the contact-less application of the identification, by which the sample containers do not need to be further treated before and after the identification process.

The identification is preferably applied in the form of a bar code, e.g. annularly, onto a cylindrical portion of the sample container. If the code is arranged in a manner that it is readable along the cylindrical axis, this code can reliably be read irrespective of the position angle of the sample container by a read device arranged perpendicular to the cylindrical axis. The code may, however, also be arranged at any other different angle to the cylindrical axis.

The identification of the sample container advantageously comprises besides a code (e.g. a bar code) also numerals and texts, which may correspond to the encoded information of the identification. Thereby, the identification can advantageously be read also without the decoded read means, and enables a direct control by the operating personnel of the analysis device.

The read device for reading the identification of the sample container may consist of a decoder device, e.g. a device for reading a bar code, it may, however, also comprise different image and pattern detection devices and methods. The identification may for instance be detected by scanners or video cameras and may be processed in a computer by means of pattern detection algorithms. By the application of such image or pattern detection methods, the encoding of the identification can be renounced and the identification can be applied directly onto the sample container in the form of numerals and/or letters. Furthermore, symbols (e.g. a company logo) can be applied together with the identification by the method according to the invention.

The invention shall now be described by means of an embodiment and the enclosed drawings.

DETAILED DESCRIPTION OF THE DRAWINGS

Figure 1:
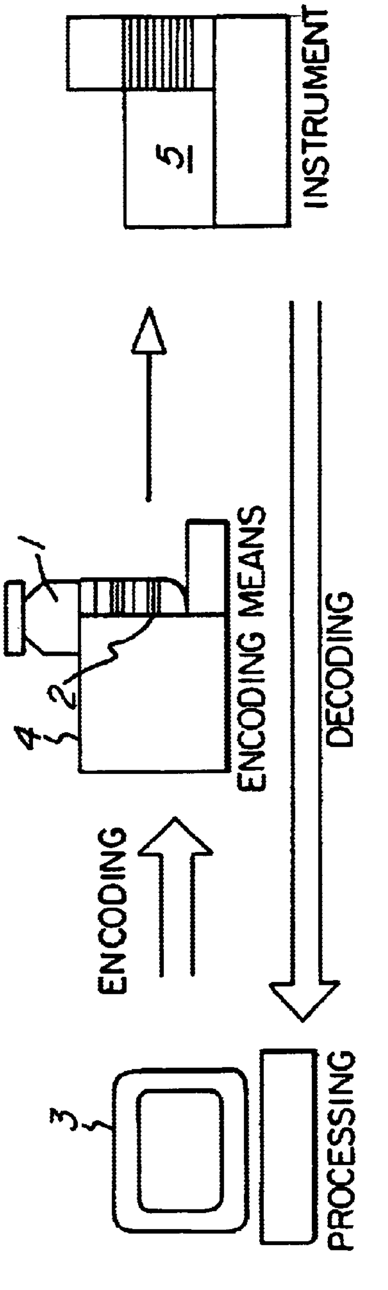
FIG. 1 (PRIOR ART)
FIG. 1 is a known identification method for sample containers.

FIG. 1 shows, as described above, a known identification device for sample containers.

Figure 2:
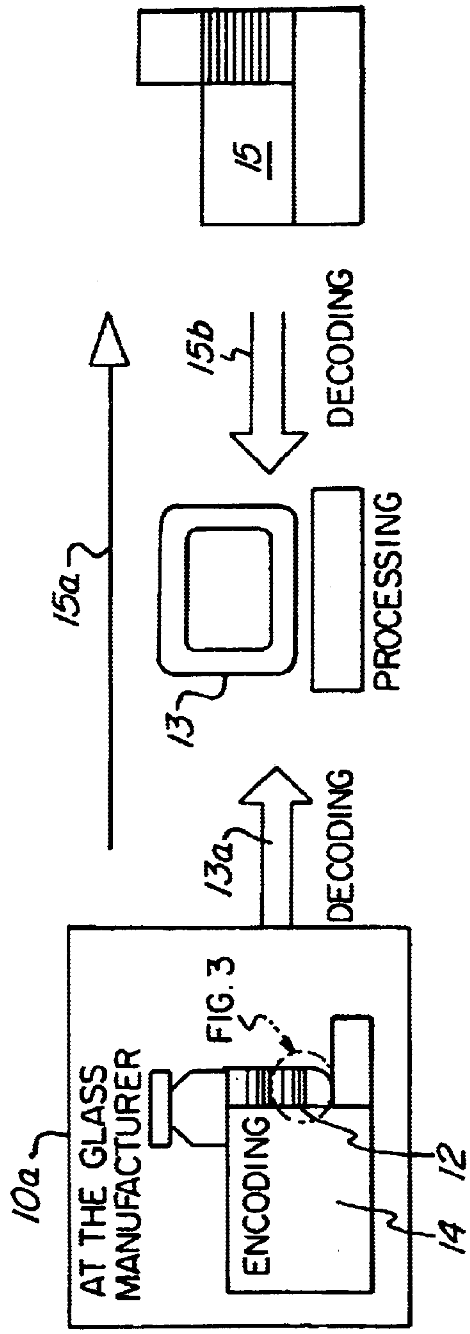
FIG. 2 is an example of an identification method according to the invention with an application for the sample identification in an analysis device.

FIG. 2 shows an example of an identification method according to the invention. The sample containers 10 (in the special example consisting of glass) are provided with an identification 12 already when producing the sample container (manufacture of glass) 10*a*. The sample container 10 may generally also consist of plastics, ceramics or metal. In the example shown, a bar code 12 is annularly applied by means of an encoding device 14 onto the glass sample container 10 around its cylindrical portion during its final cooling phase so that this code is readable along the cylindrical axis. The bar code 12 is for instance sprayed onto the container by ink in a contact-less manner via an ink jet printer. The identification can, however, also be applied by means of mechanical action, e.g. by scratching or grinding, or for instance by means of laser beams or by vapor deposition. The optical properties of the sample container 10, such as the refractive index or the reflective ability as well as the material thickness of the sample material envelope may be manipulated by the identification process in order to indicate the information content of the identification.

The user of the sample container may read and decode 13*a* the identification by means of a read unit, as for instance a scanner, and provide the information of the identification in a computer 13 and for instance assign it to an application-specific identification. Then (see arrow 15*a*), the identified sample container 10 with the sample reaches the analysis device 15, in which the sample is analyzed. During the analysis, the identified sample container 10 is also identified by a read unit by means of its identification, and the analysis date is transmitted (15*b*) along with the identification to the computer 13. In the computer 13 the measured data can then be further processed in consideration of the identification. The encoding of glass sample containers for the head space gas-chromatography basically consists of a compact (maximum of 30 mm long) annular code (e.g. 2 from 5) which can be measured in the axial direction of the sample container, wherein for instance black ink is sprayed onto a deadened glass surface of the sample container. As an alternative, the code can also be applied by a plurality of colors, for instance by alternately spraying black and white ink onto the glass surface of the sample container by the aid of the ink jet printing method. The temperature of the sample container is preferably approximately 500° C. during the identification. The above-described annular bar code is advantageously annularly readable by means of a scanner or read unit, irrespective of the position of the sample container to the read unit. As an alternative to the contact-less optical reading of the identification, this identification, when applied correctly, can also be read by mechanical scanning by means of read pens or it may be performed by the determination of the dielectric or magnetic properties of the identification of the sample container.

In the embodiment shown, a preferably eight or nine-digit numeric bar code is used by which approximately hundred million or a billion of different identifications result. By this numeric code, the sample containers can be clearly identified worldwide at continual numeration.

Figure 3:
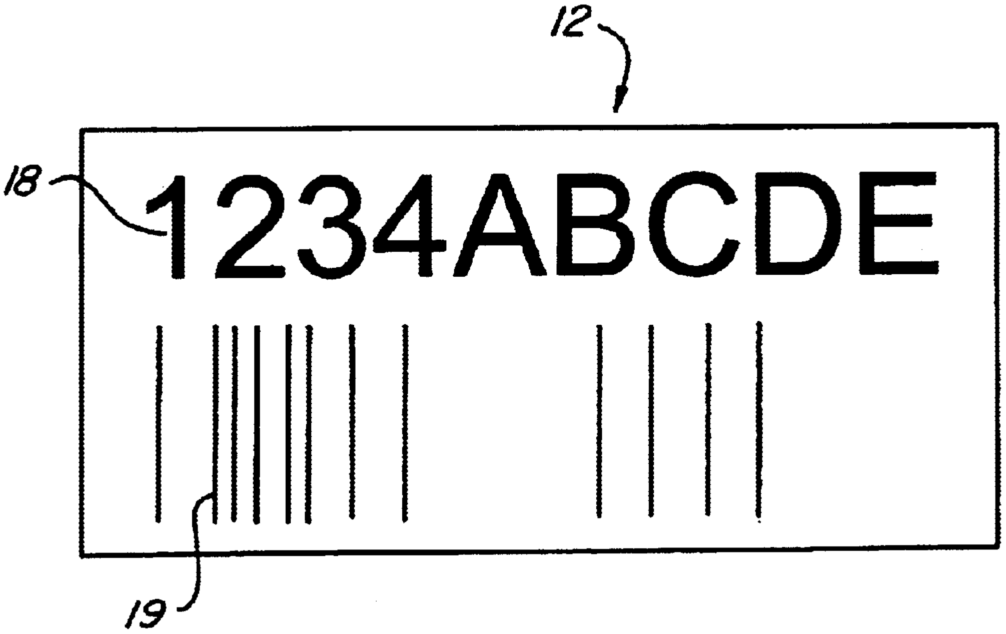
FIG. 3 is an example of indentification applied according to the invention.

FIG. 3 more particular depicts bar code 12, which was referenced in FIG. 2, to include a numeral 18, electronic information 19, or combinations of these. All that is required is for bar code 12 to impart readable information of any sort, whether readable by a user or a computer or both.

The Drawings

FIG. 1

Verarbeitung: processing

Codierung: encoding

Codiereinrichtung: encoding means

Decodierung: decoding

Instrument: instrument

FIG. 2

Beim Glashersteller: at the glass manufacturer

Coierung: encoding

Decodierung: decoding

Verarbeitung: processing

Decodierung: decoding

What is claimed is:

1. A method for labeling a sample container, to provide an identification to a sample to be received therein, during a manufacturing process of the sample container, the method comprising:

producing a sample container in a heated environment, the sample container being usable for holding a sample within the container at an operating temperature higher than a room temperature;

cooling the heated sample container to a temperature interval between a maximum temperature ocurring during the production of the sample container and the operating temperature of the sample to be received therein; and applying a marking agent for identification of the sample to a surface of the sample container at the temperature interval such that volatile constituents of the marking agent are evaporated during the manufacturing process of the sample container to prevent contamination of the sample to be received within the sample container and usable at the operating temperature.

2. A method as claimed in claim 1, wherein the marking agent is applied at a temperature between 300° C. and 600° C.

3. A method as claimed in claim 1, wherein the marking agent is applied to the surface of the container in the form of a bar code.

4. A method as claimed in claim 3, wherein said bar code is applied annularly onto a cylindrical portion of the sample container in a manner that said bar code is readable along a cylindrical axis of the sample container.

5. A method as claimed in claim 1, wherein the marking agent is applied to the surface of the container along with numerals or letters.

6. A method as claimed in claim 1, wherein the marking agent is applied to the surface of the container in the form of numerals or letters.

7. A method as claimed in claim 1, wherein the marking agent is applied to the surface of the container in the form of symbols.

8. The method according to claim 1, wherein the marking agent is applied to the surface of the container at about 500° C.

9. A method as claimed in claim 1, wherein the marking agent is applied to the container by ink jet printing.

* * * * *